(12) United States Patent
Sheridan et al.

(10) Patent No.: US 7,926,260 B2
(45) Date of Patent: Apr. 19, 2011

(54) FLEXIBLE SHAFT FOR GAS TURBINE ENGINE

(75) Inventors: William G. Sheridan, Southington, CT (US); Michael E. McCune, Colchester, CT (US); Alessio Pescosolido, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/710,863

(22) Filed: Feb. 23, 2010

(65) Prior Publication Data
US 2010/0150702 A1    Jun. 17, 2010

Related U.S. Application Data

(63) Continuation-in-part of application No. 11/481,112, filed on Jul. 5, 2006, now Pat. No. 7,704,178.

(51) Int. Cl.
*F02K 3/02* (2006.01)
*F04D 25/02* (2006.01)
(52) U.S. Cl. .................. 60/226.1; 415/124.2; 464/99
(58) Field of Classification Search ............... 60/226.1, 60/793; 415/124.2; 464/91, 98, 99
See application file for complete search history.

(56) References Cited

U.S. PATENT DOCUMENTS

| 2,591,743 | A |   | 4/1952  | Thompson |
|-----------|---|---|---------|----------|
| 3,500,660 | A | * | 3/1970  | Anderson ................. 464/99 |
| 4,265,099 | A | * | 5/1981  | Johnson et al. ............ 464/99 |
| 4,378,711 | A |   | 4/1983  | Daniel |
| 5,217,348 | A |   | 6/1993  | Rup, Jr. et al. |
| 5,433,674 | A |   | 7/1995  | Sheridan et al. |
| 5,466,198 | A |   | 11/1995 | McKibbin et al. |
| 5,472,383 | A |   | 12/1995 | McKibbin |
| 5,860,275 | A | * | 1/1999  | Newton et al. ............ 60/226.1 |
| 6,223,616 | B1|   | 5/2001  | Sheridan |
| 7,011,599 | B2|   | 3/2006  | Becquerelle et al. |
| 7,033,301 | B2|   | 4/2006  | Kimes |
| 7,214,160 | B2|   | 5/2007  | Illerhaus |
| 2008/0116009 | A1 | | 5/2008  | Sheridan et al. |

FOREIGN PATENT DOCUMENTS

| JP | 6-1889       | 1/1994 |
| JP | 2001-208146  | 8/2001 |
| JP | 2005-163666  | 6/2005 |
| JP | 2005-207472  | 8/2005 |

* cited by examiner

*Primary Examiner* — Louis Casaregola
(74) *Attorney, Agent, or Firm* — O'Shea Getz P.C.

(57) ABSTRACT

A shaft for a gas turbine engine is provided that includes a first shaft section, a second shaft section, a first flexible linkage, and a second flexible linkage. The first shaft section extends between a forward axial end and an aft axial end along a first axial centerline. The second shaft section extends between a forward axial end and an aft axial end along a second axial centerline. The first flexible linkage includes a bridge section connected between a first diaphragm and a second diaphragm. The first diaphragm is connected to the aft axial end of the first shaft section. The second diaphragm is connected to the forward axial end of the second shaft section. The second flexible linkage includes a diaphragm and a hub. The second flexible linkage diaphragm cantilevers radially outwardly from an inner radial end to an outer radial end, and is connected to the aft axial end of the second shaft section. The hub is connected to the outer radial end of the second flexible linkage diaphragm, and includes an engine shaft coupling connected to the hub.

19 Claims, 7 Drawing Sheets

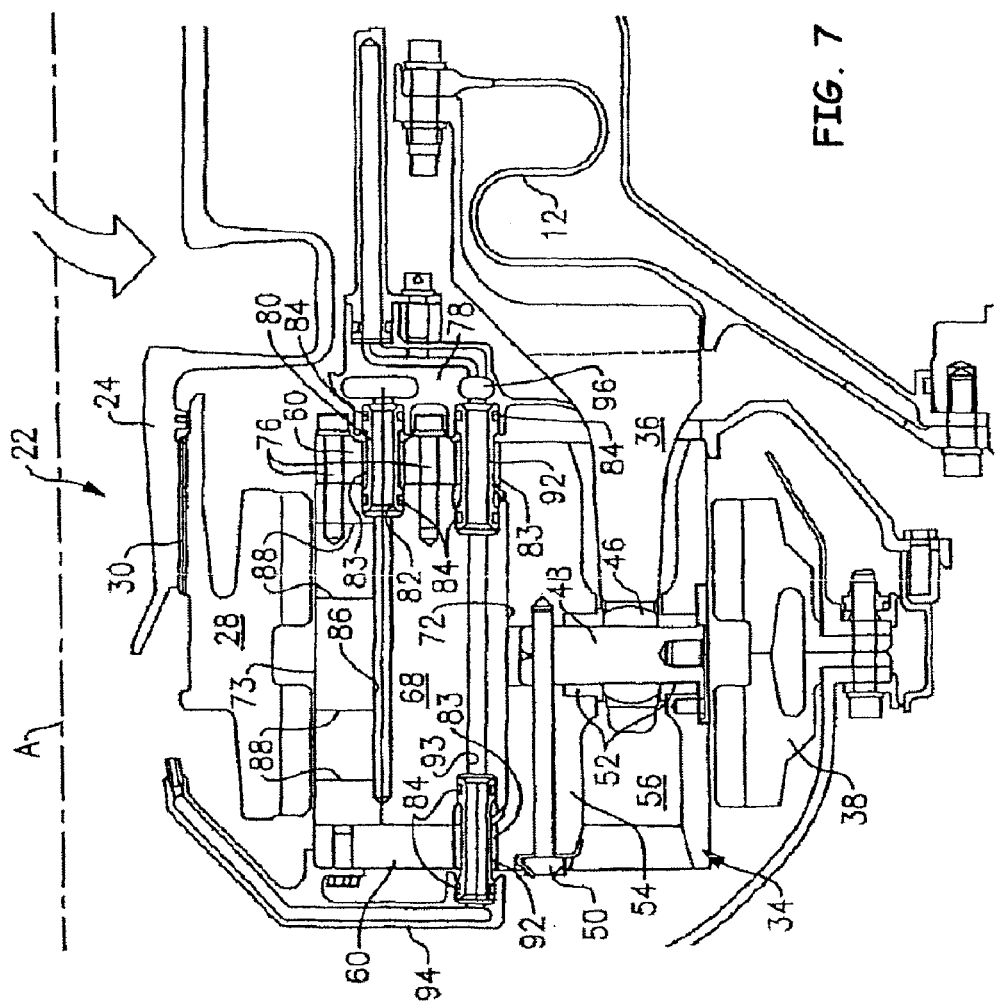

US 7,926,260 B2

FLEXIBLE SHAFT FOR GAS TURBINE ENGINE

CLAIM OF PRIORITY

This patent application is a continuation-in-part of, and claims priority from U.S. application Ser. No. 11/481,112 filed on Jul. 5, 2006, which is incorporated by reference in its entirety.

BACKGROUND OF THE INVENTION

1. Technical Field

This disclosure relates generally to shafts within a gas turbine engine in general, and to flexible shafts used within a gas turbine engine having an epicyclic gear train in particular.

2. Background Information

Gas turbine engines typically employ an epicyclic gear train connected to a turbine section of the engine, which is used to drive the fan section. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan. In arrangements in which the ring gear is fixed against rotation, the intermediate gears are referred to as "planetary" gears and the carrier is coupled to the output shaft that supports the turbo fan.

During operation, forces and torque transferred through the epicyclic gear train can create tremendous stresses within the gear train components, making them susceptible to breakage and wear, even under ideal conditions. These stresses can be exacerbated in instances where there is an axial misalignment or shift between the sun gear and the shaft. Such axial misalignments and shifts can be induced by imbalances in rotating hardware, manufacturing imperfections, and transient flexures of the shafts and support frames due to aircraft maneuvers. Consequently, there is a need in the art for a flexible shaft that can accommodate such axial misalignments and shifts, while still maintaining adequate torsional rigidity to drive the epicyclic gear train.

SUMMARY OF THE DISCLOSURE

According to a first aspect of the invention, a shaft for a gas turbine engine is provided that includes a first shaft section, a second shaft section, a first flexible linkage, and a second flexible linkage. The first shaft section extends between a forward axial end and an aft axial end along a first axial centerline. The second shaft section extends between a forward axial end and an aft axial end along a second axial centerline. The first flexible linkage includes a bridge section connected to a first diaphragm and a second diaphragm. The first diaphragm is connected to the aft axial end of the first shaft section. The second diaphragm is connected to the forward axial end of the second shaft section. The second flexible linkage includes a diaphragm and a hub. The second flexible linkage diaphragm cantilevers radially outwardly from an inner radial end to an outer radial end, and is connected to the aft axial end of the second shaft section. The hub is connected to the outer radial end of the second flexible linkage diaphragm, and includes an engine shaft coupling connected to the hub.

According to another aspect of the present invention, a gas turbine engine is provided that includes a fan section, an engine shaft, and a flexible shaft for a gas turbine engine. The flexible shaft includes a first shaft section, a second shaft section, a first flexible linkage, and a second flexible linkage. The first shaft section extends between a forward axial end and an aft axial end along a first axial centerline. The second shaft section extends between a forward axial end and an aft axial end along a second axial centerline. The first flexible linkage includes a bridge section connected to a first diaphragm and a second diaphragm. The first diaphragm is connected to the aft axial end of the first shaft section. The second diaphragm is connected to the forward axial end of the second shaft section. The second flexible linkage includes a diaphragm and a hub. The second flexible linkage diaphragm cantilevers radially outwardly from an inner radial end to an outer radial end, and is connected to the aft axial end of the second shaft section. The hub is connected to the outer radial end of the second flexible linkage diaphragm, and includes an engine shaft coupling connected to the hub.

BRIEF DESCRIPTION OF THE DRAWINGS

FIG. 7 is an enlarged view of a portion of the epicyclic gear train shown in FIG. 2.

DETAILED DESCRIPTION OF THE INVENTION

Figure 1:
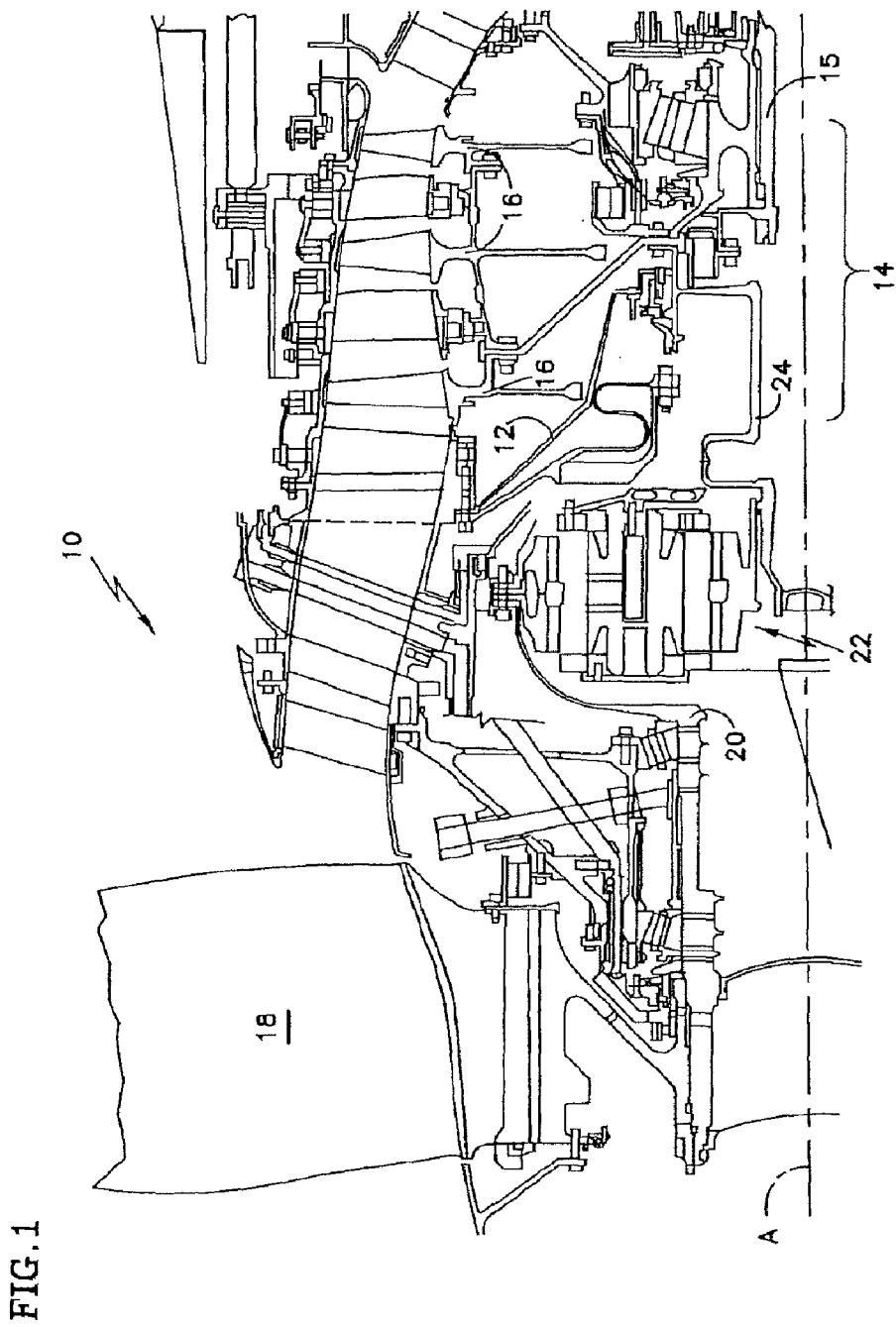
FIG. 1 is a partial cross-sectional view of a front portion of a gas turbine engine illustrating a fan section, an epicyclic gear train, a compressor shaft and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by an engine shaft 15 about an axis A. A fan 18 is supported on a fan shaft 20 that is driven by a compressor shaft 24, which supports the compressor hubs 16, through an epicyclic gear train 22.

Figure 2:
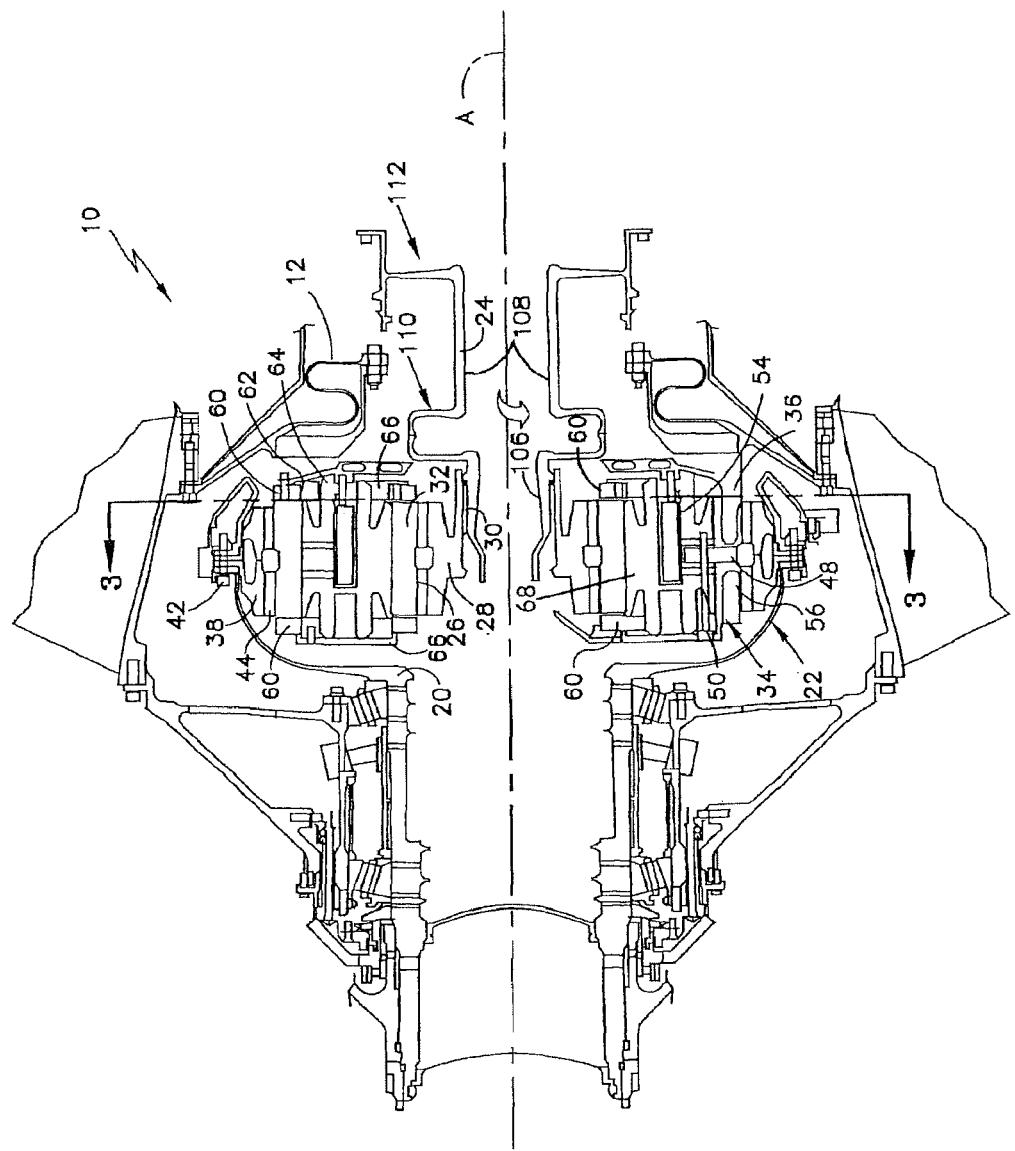
FIG. 2 is a cross-sectional view of the epicyclic gear train and the compressor shaft shown in FIG. 1.
Figure 3:
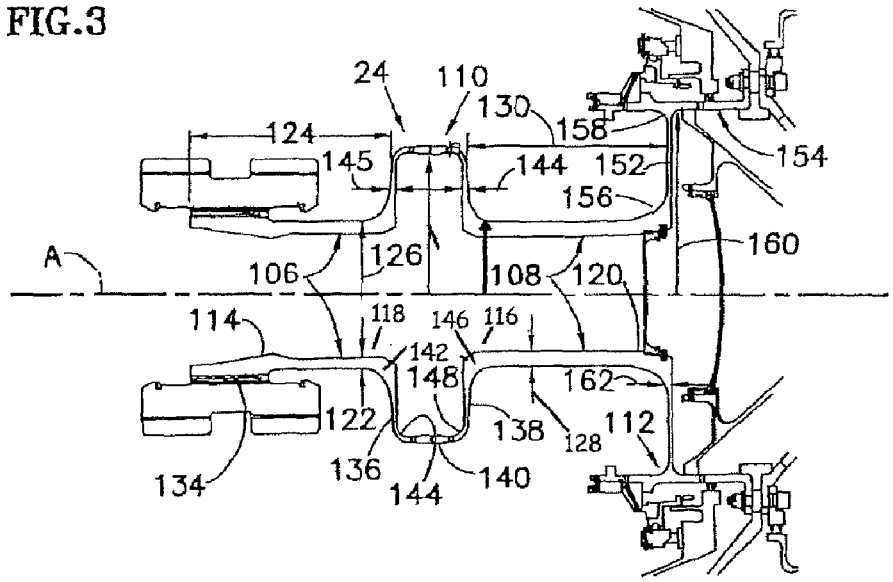
FIG. 3 is a cross-sectional view of another embodiment of the epicyclic gear train and the compressor shaft shown in FIG. 1.

Referring to FIGS. 2 and 3, the compressor shaft 24 includes one or more annular shaft sections 106, 108 and one or more annular flexible linkages 110, 112. In the specific embodiment in FIG. 3, the compressor shaft includes a first shaft section 106, a second shaft section 108, a first flexible linkage 110, and a second flexible linkage 112.

Now referring to FIG. 3, each shaft section 106, 108 extends axially (e.g., parallel to the axis A) between a forward end 114, 116 and an aft end 118, 120. The first shaft section 106 has a wall thickness 122, a length 124, and an outer radius 126. The second shaft section 108 has a wall thickness 128, a length 130, and an outer radius 132. In the embodiment in FIG. 3, the outer radiuses 126, 132 of the first and the second shaft sections 106, 108 are substantially equal. The present invention, however, is not limited to the aforesaid embodiment; e.g., the outer radius 132 of the second shaft section 108 can be greater than the outer radius 126 of the first shaft section 106 (e.g., see FIGS. 1 and 2). The first shaft section 106 includes a forward coupling 134 (e.g., a splined connection) disposed around its forward end 114.

The first flexible linkage 110 includes a first diaphragm 136, a second diaphragm 138, and a bridge section 140. The first diaphragm 136 normally (e.g., where no misalignment exists) extends substantially perpendicularly to the engine centerline A, between an inner radial end 142 and an outer radial end 144, and has a thickness 145. The second diaphragm 138 normally (e.g., where no misalignment exists) extends substantially perpendicularly to the engine centerline A, between an inner radial end 146 and an outer radial end 148, and has a thickness 149. In some embodiments, the first and the second diaphragms 136, 138 are each configured having a tapered wall cross-sectional geometry, where the diaphragm thickness 145, 149 at the inner radial end 142, 146 is greater than the thickness of the outer radial end 144, 148. The first and the second diaphragms 136, 138 each have a mean thickness 145, 149 that is sized less than the wall thickness 122, 128 of the first and the second shaft sections 106, 108. The bridge section 140 extends axially (e.g., substantially parallel to the axis A) between the outer ends 144, 148 of the first and the second diaphragms 136, 138. The bridge section 140 is disposed at a radial position 150 that is greater than the outer radiuses 126, 132 of the first and the second shaft sections 106, 108. Another suitable embodiment of the first flexible linkage 110, in the form of an undulant flexible section, is disclosed in U.S. Pat. No. 5,433,674 to Sheridan et al., which is hereby incorporated by reference in its entirety.

Figure 4:
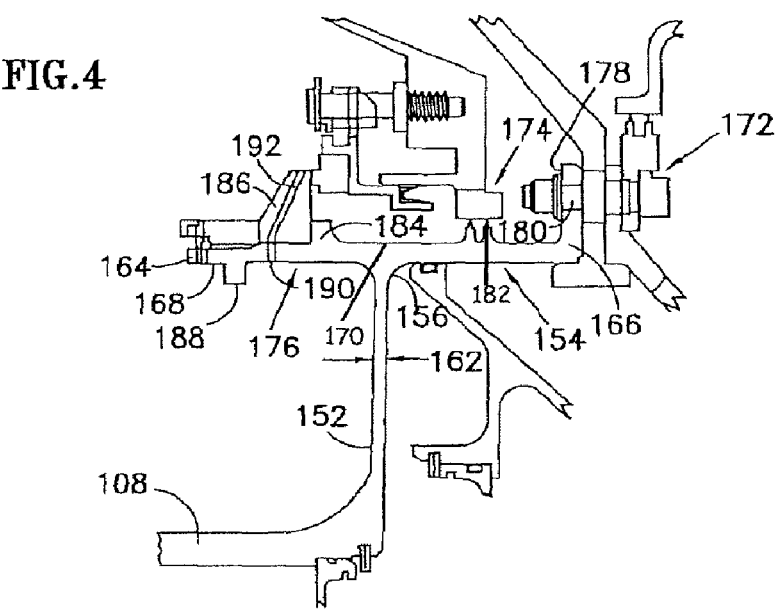
FIG. 4 is a cross-sectional view of an aft portion of the compressor shaft shown in FIG. 3.

Referring to FIG. 4, the second flexible linkage 112 includes a diaphragm 152 and an annular hub 154. The diaphragm 152 extends radially, substantially perpendicularly to the centerline A, between an inner radial end 156 and an outer radial end 158. In the embodiment shown in FIG. 4, the diaphragm 152 has a radial height 160 greater than the radial position 150 of the bridge section 140 of the first flexible linkage 110, and has a substantially uniform thickness 162. In other embodiments (see FIG. 2), the diaphragm 152 can have a tapered wall cross-sectional geometry, where the thickness 162 at the inner radial end 156 is greater than the thickness 162 at the outer radial end 158. The thickness 162 (or mean thickness) is sized less than the wall thicknesses 122, 128 of the first and the second shaft sections 106, 108. In the embodiments shown in FIGS. 3 and 4, the fillets positioned proximate one or both ends of the diaphragms 136, 138, 152 may increase the thickness of the diaphragm in that immediate region. The tapered or uniform thickness referred to above is the portion of the diaphragm extending therebetween. The hub 154 (e.g., see FIG. 4) is disposed on the outer radial end 158 of the diaphragm 152. The hub 154 extends axially (e.g., substantially perpendicularly to the diaphragm 152) between a forward axial end 164 and an aft axial end 166, and has an inner radial surface 168 and an outer radial surface 170. The hub 154 includes an engine shaft coupling 172, a seal assembly 174, and an annular lubrication well 176.

The engine shaft coupling 172 includes a flange 178 disposed at the aft end 166 of the hub 154. The flange 178 extends radially between the outer radial surface 170 of the hub 154. The flange 178 includes a plurality of circumferentially disposed fastener apertures 180 which are adapted for connecting the hub 154 to an engine shaft 15 (see FIG. 1) via a plurality of fasteners. The engine shaft coupling 172 is, however, not limited to the aforesaid configuration. For example, in alternate embodiments, the shaft coupling 172 may be configured as a splined connection.

The seal assembly 174 is adapted to prevent the flow of gas between compartments. In the embodiment shown in FIG. 4, the seal assembly 174 includes one or more knife edge seals 182 and a sealing protrusion 184. Alternative embodiments may have only one of the knife edge seals 182 or sealing protrusion 184. The knife edge seals 182 are adapted to engage with an annular sealing ring connected to the stator. The knife edge seals 182 extend radially out from the outer radial surface 170 of the hub 154. The sealing protrusion 184 is adapted to engage with an annular carbon seal 186 connected to a stator. The sealing protrusion 184 is disposed proximate to the forward axial end 164 of the hub, and extends radially out from the outer radial surface 170 of the hub 154.

The annular lubrication well 176 is formed between an annular lip 188 and the outer radial end 158 of the diaphragm 152 of the second flexible linkage 112. The annular lip 188 extends radially inward from the inner radial surface 168 of the hub 154. In the embodiment shown in FIG. 4, a plurality of circumferentially disposed lubricant passages 190 extend radially through the hub 154 and the sealing protrusion knife edge seals 182 and a sealing protrusion 184. The lubricant passages 190 are aligned with apertures 192 disposed in the carbon seal 186. The lubrication passages 190 are operable to pass lubrication through the carbon seal 186 and to transfer thermal energy away from the carbon seal 186.

Referring again to FIG. 3, the first shaft section 106, the first flexible linkage 110, the second shaft section 108, and the second flexible linkage 112 are sequentially connected along centerline A. In this configuration, each of the diaphragms 136, 138, 152 for the first and the second flexible linkages 110, 112 is configured as a cantilevered member having a spring constant. As a result, the compressor shaft 24 is operable to (i) permit axial misalignment and/or axial shifting while (ii) providing torsional rigidity (i.e., substantially preventing twisting) between the epicyclic gear train 22 and the compressor section, which will be described below in further detail.

Referring to FIG. 2, in the present embodiment, the epicyclic gear train 22 is a star gear train. Of course, the claimed invention also applies to other epicyclic gear trains such as a planetary arrangement. Referring to FIG. 2, the epicyclic gear train 22 includes a sun gear 28 that is connected to the compressor shaft 24, which provides rotational input, by the splined connection 30. A carrier 34 is fixed to the housing 12 by a torque frame 36. The carrier 34 supports intermediate gears (which are star gears 32 in the arrangement shown) that are coupled to the sun gear 28 by meshed interfaces 26 between the teeth of the sun and star gears 28, 32. A ring gear 38 surrounds the carrier 34 and is coupled to the star gears 32 by meshed interfaces 44. The ring gear 38, which provides rotational output, is secured to the turbo fan shaft 20 by connection 42.

Figure 5:
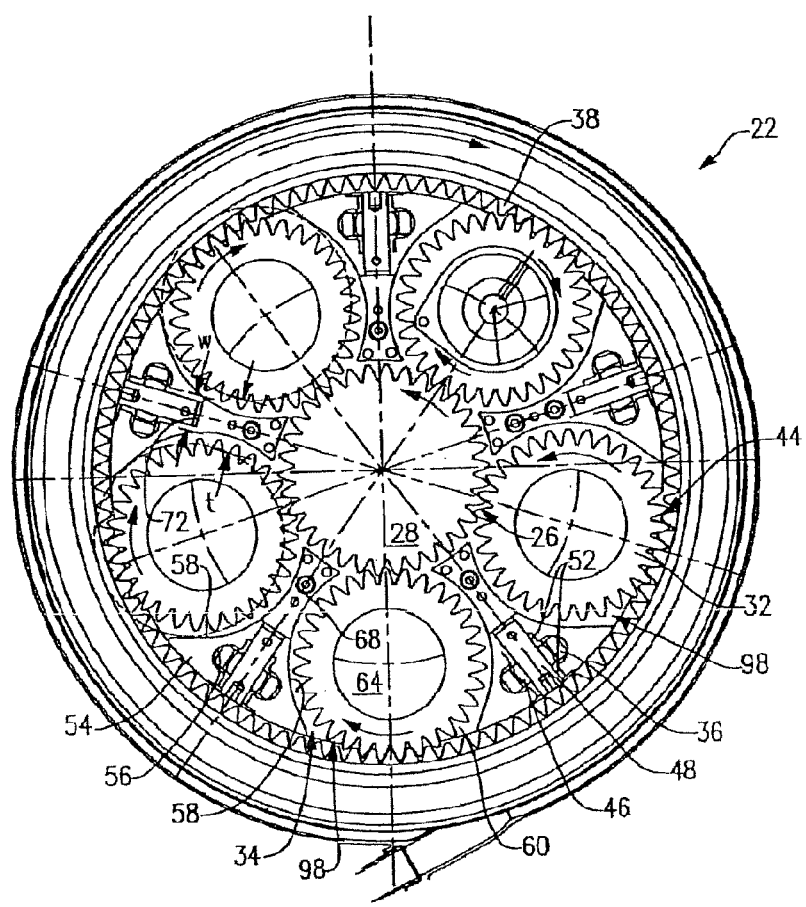
FIG. 5 is an end view of the epicyclic gear train taken along line 3-3 in FIG. 2 with a pair of star gears shown in phantom in an installation position.

In one example, the torque frame 36 grounds the carrier 34 to the housing 12 in a known manner For example, mounts 54 have apertures 56 receiving fingers of the torque frame 36, as shown in FIGS. 2 and 5. Pins 48 that extend through spherical bearings 46 and bushings 52 secure the fingers to the carrier 34. Fasteners 50 retain the pins 48 to the carrier 34.

The carrier 34 is a unitary structure manufactured from one piece for improved structural rigidity and ease of assembly. The carrier 34 includes spaced apart side walls 60 that are interconnected by the mounts 54, which are generally wedge-shaped members, as best shown in FIG. 5. The mounts 54 and side walls 60 are unitary with one another. The mounts 54 have opposing curved surfaces 58 that are in close proximity to the star gears 32 and generally follow the curvature of the teeth of the star gears 32 so that any oil on the curved surfaces 58 will likely find its way to the star gears 32 for additional lubrication.

The mounts 54 are circumferentially spaced about the carrier 34 to provide apertures 98 through which the star gears 32 extend to engage the ring gear 38. Returning to FIG. 2, the side walls 60 include holes 62 for receiving a journal bearing 64 that supports each of the star gears 32. Each journal bearing 64 is retained within the carrier 34 by retainers 66 fastened to the side walls 60.

Figure 6:
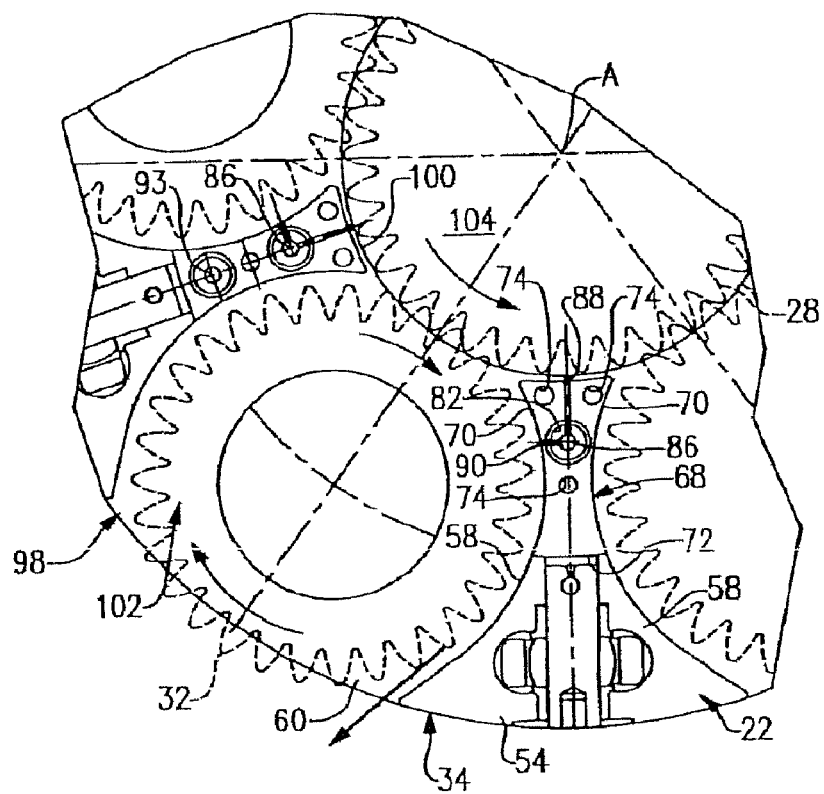
FIG. 6 is an enlarged view of a portion of the epicyclic gear train shown in FIG. 5 with a sun gear and star gears shown in phantom.

Referring to FIG. 2, oil baffles 68 are arranged between the side walls 60 near each of the mounts 54. Referring to FIGS. 6 and 7, the baffles 68 include ends 72 that abut the mounts 54, in the example shown. The baffles 68 also include opposing curved surfaces 70 arranged in close proximity to the star gears 28. The curved surfaces 58, 70 are contiguous with and adjoin one another, in the example shown, and provide gear pockets 102 that receive the star gears 32. A gear pocket 104, which receives the sun gear 28, is also provided between a surface 73 on each of the baffles 68 opposite the ends 72.

In one example, one of the side walls 60 includes holes 74 that receive fasteners 76 which secure each of the baffles 68 to the carrier 34. The baffles 68 include a lubrication passage provided by a primary passage 86 that fluidly communicates with a lubricant distributor 78. The lubricant distributor 78 is fed oil from a lubricant supply 96. In one example, the baffles 68 include openings 82 that receive a tube 80 extending through a hole 83 in the side wall 60. Seals 84 seal the tube 80 to the opening 82 and lubricant distributor 78. Other tubes 92 having seals 84 are used to provide oil to an external spray bar 94 through another lubrication passage (spray bar passage 93 that extends through one of the baffles 68). The external spray bar 94 is secured to the carrier 34 and sprays oil in the vicinity of the sun gear 28 near the splined connection 30 (shown in FIGS. 2 and 7).

The primary passage 86 is in communication with first and second passages 88, 90 that spray oil on the teeth of the sun and star gears 28, 32. In the example shown, the first and second passages 88, 90 are arranged ninety degrees from one another.

With the example baffles 68, lubricant distribution is integrated into the baffle so that separate components are eliminated. The baffles 68 can be constructed from a different, lighter weight material than the carrier 34.

The example carrier 34 can be constructed from one piece, which improves the structural integrity of the carrier. A central opening 100 is machined in at least one of the side walls 60 and provides the gear pocket 104. Gear pockets 102 are machined between the side walls 60 and mounts 54 for each of the star gears 32 and form apertures 98 at an outer circumference of the carrier 34. Referring to FIG. 5, the star gears 32 are inserted into the central opening 100 (see FIG. 6) and moved radially outwardly so that they extend through the apertures 98 and are preferably in abutment with the mounts 54 (position indicated by dashed lines in FIG. 5). In this position, there is an adequate gap, t, between the teeth of adjacent star gears 32 to accommodate a width, w, of the end 72 of the baffles 68. Once the baffles 68 have been inserted, the star gears 32 can be repositioned, as shown by the solid lines, and the sun gear 28 can be inserted into the central opening 100 so that it meshes with the star gears 32. The baffles 68 are secured to the carrier 34 using fasteners 76. The tubes 80, 92 can be inserted and the rest of the lubricant distribution system can be connected.

Figure 8A:
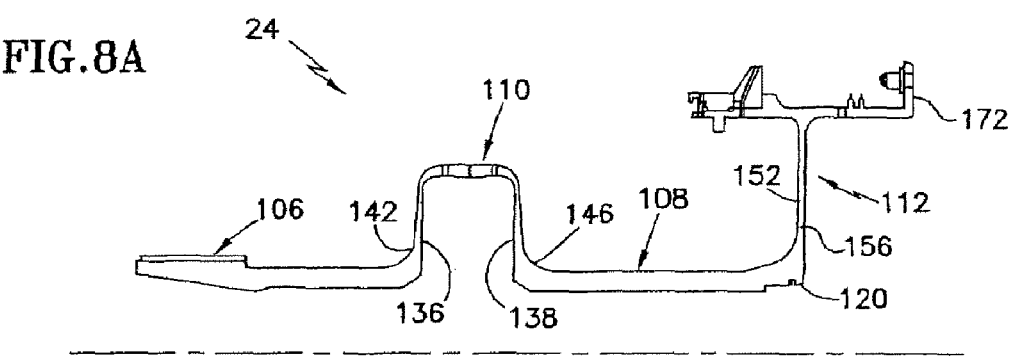
FIGS. 8A and 8B diagrammatically illustrate an axial shift in the compressor shaft shown in FIG. 3.
Figure 8B:
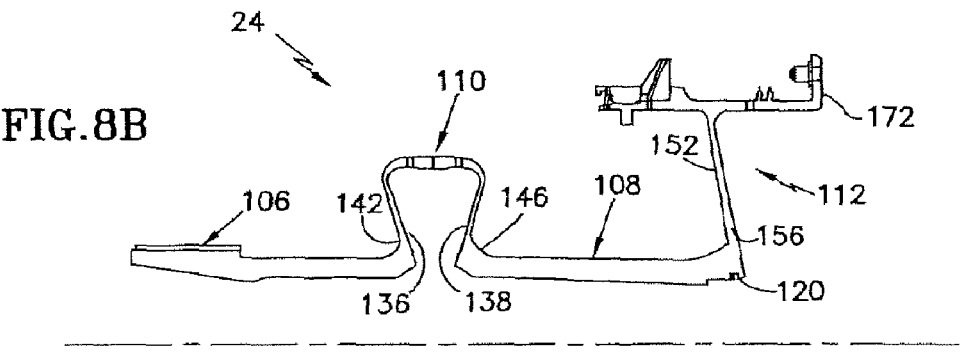
Figure 9A:
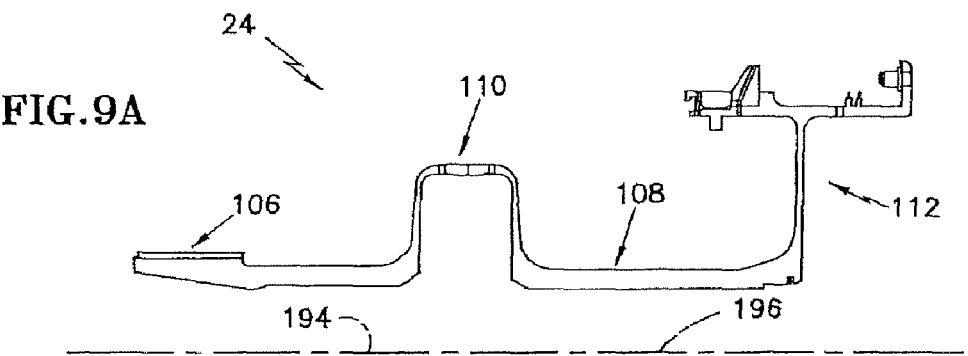
FIGS. 9A and 9B diagrammatically illustrate an axial misalignment in the compressor shaft shown in FIG. 3.
Figure 9B:
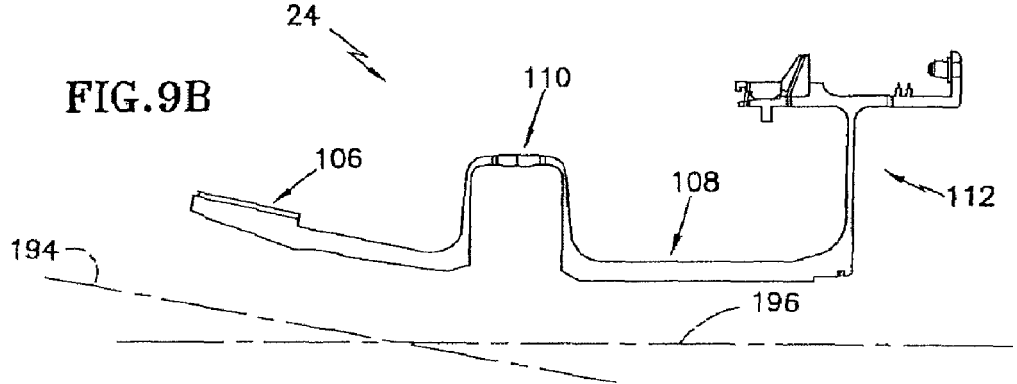

During operation of the turbine engine, imbalances in rotating engine components, for example, due to manufacturing imperfections, and transient flexure of engine shafts and support frames can subject the gears of the epicyclic gear train to moments and/or forces. The present invention can at least partially reduce these moments and forces by compensating for movement of the epicyclic gear train relative to the compressor section. For example, referring to FIGS. 8A and 8B, where an axial shift decreases a distance between the epicyclic gear train and the compressor section, one or more of the flexible linkages 110, 112 can adjust to correspondingly decrease an overall length of the shaft 24. Specifically, the inner ends 142, 146 of the first and the second diaphragms 136, 138 of the first flexible linkage 110 can deflect toward one another and thereby decrease the axial distance between the aft end 118 of the first shaft section 106 and the forward end 116 of the second shaft section 108. The outer end 158 of the diaphragm 152 of the second flexible linkage 112 can be shifted forward relative to its inner end 156, thereby decreasing the axial distance between the aft end 120 of the second shaft section 108 and the engine shaft coupling 172. In another example, an axial misalignment between the gear train and the compressor centerline can occur. To accommodate the misalignment, one or more of the flexible linkages 110, 112 can deflect to permit the rotational centerline 194, 196 of a shaft section 106, 108 to skew and thereby accommodate the misalignment. In FIG. 9A, the centerlines 194, 196 of the shaft sections 106, 108 are shown aligned with one another. In FIG. 9B, in contrast, the centerline 194 of the first shaft section 106 is skewed from the centerline 196 of the second shaft section 108. It should be noted that the deflections of the flexible linkages 110, 112 within the shaft embodiments shown in FIGS. 8B and 9B are exaggerated to facilitate the explanation.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A shaft for a gas turbine engine, comprising:
a first shaft section, extending between a forward axial end and an aft axial end along a first axial centerline;
a second shaft section, extending between a forward axial end and an aft axial end along a second axial centerline;
a first flexible linkage including a bridge section connected between a first diaphragm and a second diaphragm, which first diaphragm is connected to the aft axial end of the first shaft section, and which second diaphragm is connected to the forward axial end of the second shaft section; and
a second flexible linkage including a diaphragm and a hub, which diaphragm cantilevers radially outwardly from an inner radial end to an outer radial end and is connected to the aft axial end of the second shaft section, and which hub is connected to the outer radial end of the second flexible linkage diaphragm, and includes an engine shaft coupling connected to the hub.

2. The shaft of claim 1, wherein the diaphragm of the second flexible linkage radially tapers such that a thickness of the diaphragm at the inner radial end is greater than the thickness at the outer radial end.

3. The shaft of claim 1, wherein the diaphragm of the second flexible linkage has a thickness at the inner radial end that substantially equal to the thickness at the outer radial end.

4. The shaft of claim 1, wherein the diaphragm of the second flexible linkage extends radially outwardly in a direction that is substantially perpendicular to the second axial centerline.

5. The shaft of claim 1, wherein the engine shaft coupling includes a flange that extends radially from the aft end of the hub, which flange includes a plurality of circumferentially disposed fastener apertures.

6. The shaft of claim 1, wherein the hub further includes one or more radially extending knife edge seals disposed on an outer radial surface of the hub.

7. The shaft of claim 1, wherein the hub further includes a radially extending sealing protrusion adapted to engage a carbon seal.

8. The shaft of claim 7, wherein the hub further includes an annular lubrication well having a lip that extends radially inward from an inner surface of the hub, which well is disposed between the lip and the diaphragm of the second flexible linkage.

9. The shaft of claim 8, further comprising a plurality of circumferentially disposed lubrication passages extending through the hub in a region between the sealing protrusion and the lip.

10. A gas turbine engine, comprising:
a fan section;
an engine shaft; and
a flexible shaft for a gas turbine engine, wherein the flexible shaft includes:
a first shaft section, extending between a forward axial end and an aft axial end along a first axial centerline;
a second shaft section, extending between a forward axial end and an aft axial end along a second axial centerline;
a first flexible linkage including a bridge section connected between a first diaphragm and a second diaphragm, which first diaphragm is connected to the aft axial end of the first shaft section, and which second diaphragm is connected to the forward axial end of the second shaft section; and
a second flexible linkage including a diaphragm and a hub, which diaphragm cantilevers radially outwardly from an inner radial end to an outer radial end and is connected to the aft axial end of the second shaft section, and which hub is connected to the outer radial end of the second flexible linkage diaphragm, and includes an engine shaft coupling connected to the hub.

11. The engine of claim 10, wherein the diaphragm of the second flexible linkage radially tapers such that a thickness of the diaphragm at the inner radial end is greater than the thickness at the outer radial end.

12. The engine of claim 10, wherein the diaphragm of the second flexible linkage has a thickness at the inner radial end that substantially equal to the thickness at the outer radial end.

13. The engine of claim 10, wherein the diaphragm of the second flexible linkage extends radially outwardly in a direction that is substantially perpendicular to the second axial centerline.

14. The engine of claim 10, wherein the engine shaft coupling includes a flange that extends radially from the aft end of the hub, which flange includes a plurality of circumferentially disposed fastener apertures.

15. The engine of claim 10, wherein the hub further includes one or more radially extending knife edge seals disposed on an outer radial surface of the hub.

16. The engine of claim 10, wherein the hub further includes a radially extending sealing protrusion adapted to engage a carbon seal.

17. The engine of claim 16, wherein the hub further includes an annular lubrication well having a lip that extends radially inward from an inner surface of the hub, which well is disposed between the lip and the diaphragm of the second flexible linkage.

18. The engine of claim 17, further comprising a plurality of circumferentially disposed lubrication passages extending through the hub in a region between the sealing protrusion and the lip.

19. The engine of claim 10, wherein the engine shaft is operable to drive a compressor section of the engine.

* * * * *